(12) United States Patent
Yu et al.

(10) Patent No.: US 11,093,006 B2
(45) Date of Patent: Aug. 17, 2021

(54) DISPLAY MODULE AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Chao Yu, Beijing (CN); Jiaqiang Wang, Beijing (CN); Jianye Tang, Beijing (CN); Yanchao Zhang, Beijing (CN); Dawei Wang, Beijing (CN); Dong Liu, Beijing (CN); Yanming Wang, Beijing (CN); Cheng Chang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 181 days.

(21) Appl. No.: 16/465,642

(22) PCT Filed: Nov. 16, 2018

(86) PCT No.: PCT/CN2018/115790
§ 371 (c)(1),
(2) Date: May 31, 2019

(87) PCT Pub. No.: WO2019/179138
PCT Pub. Date: Sep. 26, 2019

(65) Prior Publication Data
US 2021/0096603 A1 Apr. 1, 2021

(30) Foreign Application Priority Data
Mar. 22, 2018 (CN) .......................... 201810239072.X

(51) Int. Cl.
*G06F 1/16* (2006.01)

(52) U.S. Cl.
CPC .......... *G06F 1/1656* (2013.01); *G06F 1/1607* (2013.01); *G06F 1/1637* (2013.01); *G06F 1/1698* (2013.01); *G06F 1/1626* (2013.01)

(58) Field of Classification Search
CPC ..... G06F 1/1637; G06F 1/1656; G06F 1/1698
See application file for complete search history.

(56) References Cited

U.S. PATENT DOCUMENTS

| 6,411,353 B1* | 6/2002 | Yarita ............... G02F 1/133308 |
| | | 349/150 |
| 8,952,911 B2* | 2/2015 | van Lieshout ........ G06F 3/0412 |
| | | 345/173 |

(Continued)

FOREIGN PATENT DOCUMENTS

| CN | 103576983 A | 2/2014 |
| CN | 103873616 A | 6/2014 |

(Continued)

OTHER PUBLICATIONS

Search Report and Written Opinion for International Application No. PCT/CN2018/115790 dated Nov. 16, 2018.

*Primary Examiner* — Adrian S Wilson
(74) *Attorney, Agent, or Firm* — Calfee, Halter & Griswold LLP

(57) ABSTRACT

A display module includes a cover plate, a display integrated circuit, a grounding lead wire and a shielding layer. The display integrated circuit is disposed on a side of the cover plate and has a grounding terminal. A first end of the grounding lead wire is electrically connected to the grounding terminal, and a second end of the grounding lead wire is electrically connected to a grounding conductor. The shielding layer is disposed between the cover plate and the display (Continued)

integrated circuit and is electrically connected to the grounding conductor.

20 Claims, 2 Drawing Sheets

(56) References Cited

U.S. PATENT DOCUMENTS

| | | | |
|---|---|---|---|
| 2005/0185380 A1* | 8/2005 | Lee | G06F 1/203 361/704 |
| 2008/0018551 A1* | 1/2008 | Cheng | H01Q 1/2266 343/873 |
| 2012/0169668 A1* | 7/2012 | Liu | G06F 1/1637 345/175 |
| 2014/0028931 A1* | 1/2014 | Tsurusaki | G06F 3/0445 349/12 |
| 2014/0043244 A1* | 2/2014 | van Lieshout | G06F 1/1652 345/173 |
| 2017/0054836 A1 | 2/2017 | Chung et al. | |
| 2017/0276979 A1 | 9/2017 | Li et al. | |

FOREIGN PATENT DOCUMENTS

| | | |
|---|---|---|
| CN | 204348263 U | 5/2015 |
| CN | 204422905 U | 6/2015 |
| CN | 105319751 A | 2/2016 |
| CN | 108255247 A | 7/2018 |
| CN | 207895358 U | 9/2018 |

* cited by examiner

DISPLAY MODULE AND DISPLAY DEVICE

CROSS REFERENCE TO RELATED APPLICATIONS

The present application is a 35 U.S.C. 371 national stage application of PCT International Application No. PCT/CN2018/115790, filed on Nov. 16, 2018, which claims the benefit of a Chinese Patent Application No. 201810239072.X, filed on Mar. 22, 2018, the entire disclosure of which is incorporated herein by reference.

FIELD

The present disclosure relates to the technical field of display, and particularly to a display module and a display device having the display module.

BACKGROUND

In the design of display devices, users' experience is a key factor for deciding success or failure of the design. Especially in mobile phone design, a narrow-frame, thin and full-screen design is a development trend of the industry of mobile phone design. The full-screen design brings about a wave of innovations in mobile phones and mobile phone components, but the full-screen design enables a very close distance between the display integrated circuit of the display screen and the antenna of the mobile phone. This case causes an adverse consequence of increasing the interference in display screen radio frequency radiation. Therefore, the full-screen mobile phones raise higher and higher shielding requirements (i.e., anti-interference requirements) for the display screen radio frequency radiation.

SUMMARY

According to an aspect of the disclosure, there is provided a display module, including:

a cover plate;

a display integrated circuit disposed on a side of the cover plate and having a grounding terminal;

a grounding lead wire whose first end is electrically connected to the grounding terminal, and whose second end is electrically connected to a grounding conductor; and a shielding layer disposed between the cover plate and the display integrated circuit and electrically connected to the grounding conductor.

In some exemplary embodiments of the present disclosure, a grounding window is disposed at a section of the grounding lead wire adjacent to the cover plate, and the grounding conductor is electrically connected to the grounding lead wire through the grounding window.

In some exemplary embodiments of the present disclosure, the display module further includes a backlight module, and the display integrated circuit includes:

a circuit body disposed on a side of the backlight module facing away from the cover plate;

a first bent portion connected to the circuit body; and a second bent portion connected to the first bent portion and located on a side of the backlight module facing the cover plate, wherein the second bent portion is configured to form at least a portion of the grounding lead wire and provide with a grounding window, the grounding conductor is electrically connected to the grounding lead wire through the grounding window.

In some exemplary embodiments of the present disclosure, the display module further includes a backlight integrated circuit, and the grounding lead wire is configured as a portion of the backlight integrated circuit.

In some exemplary embodiments of the present disclosure, the display module further includes a backlight integrated circuit electrically connected to the grounding lead wire at a second end of the grounding lead wire.

In some exemplary embodiments of the present disclosure, the display module further includes an insulating layer disposed between the display integrated circuit and the shielding layer, and an orthographic projection of the insulating layer on the cover plate covers an orthographic projection of the display integrated circuit on the cover plate.

In some exemplary embodiments of the present disclosure, the display integrated circuit includes a driver integrated circuit.

In some exemplary embodiments of the present disclosure, the grounding lead wire includes a copper lead wire with an insulating sheath, a grounding window is provided on the insulating sheath of the grounding lead wire, and the grounding conductor is electrically connected to the grounding lead wire through the grounding window.

In some exemplary embodiments of the present disclosure, the grounding lead wire is substantially U-shaped.

In some exemplary embodiments of the present disclosure, the display integrated circuit is a flexible circuit board.

In some exemplary embodiments of the present disclosure, the grounding conductor is an elastic conductor.

In some exemplary embodiments of the present disclosure, the elastic conductor is configured to protrude from the backlight module.

In some exemplary embodiments of the present disclosure, the elastic conductor is a conductive foam.

In some exemplary embodiments of the present disclosure, the shielding layer is bonded to a side of the cover plate facing the display integrated circuit.

According to another aspect of the present disclosure, there is provided a display device including the above display module.

Additional aspects and advantages of the present disclosure will be illustrated partly in the subsequent description, and partly become apparent from the description, or may be acquired through the implementation of the present disclosure.

BRIEF DESCRIPTION OF DRAWINGS

The above and other features and advantages of the present disclosure will be made more apparent by describing exemplary embodiments with reference to figures.

DETAILED DESCRIPTION

Figure 1:
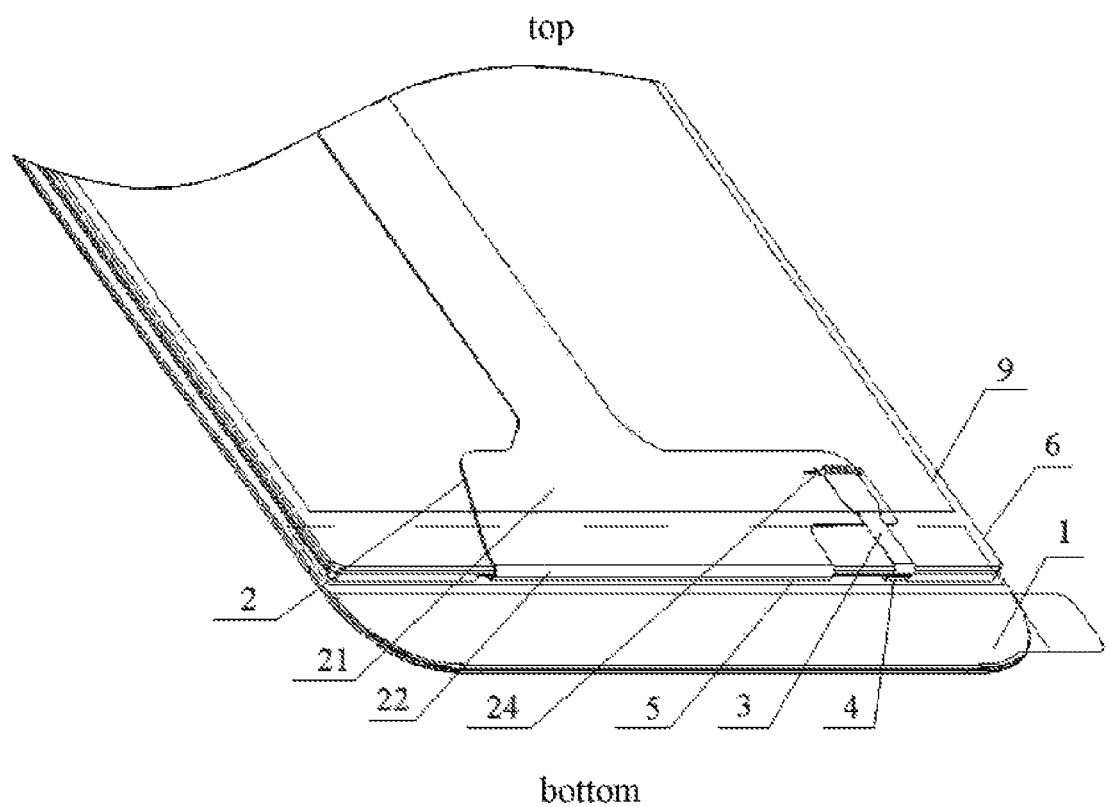
FIG. 1 is a perspective schematic structural view of an exemplary embodiment of a display module of the present disclosure.

Exemplary embodiments will now be described more fully with reference to the figures. However, the exemplary embodiments can be embodied in a variety of forms and should not be construed as being limited to the embodiments set forth herein. On the contrary, provision of these embodiments makes the present disclosure full and complete, and conveys concepts of the exemplary embodiments thoroughly to those skilled in the art. The same reference numerals in the figures denote the same or like structures, so detailed description thereof will be omitted.

In view of the drawback that the interference in the display screen radio frequency radiation is larger in the prior art, the present disclosure provides a display module having less interference in display screen radio frequency radiation and a display device having the display module.

Some exemplary embodiments of the present disclosure provide a display module that may include a cover plate, a grounding lead wire, a shielding layer and a grounding conductor. The grounding lead wire is electrically connected with a grounding terminal; the shielding layer is located on a side of the cover plate facing the grounding lead wire; the grounding conductor is disposed between the shielding layer and the grounding lead wire, and the shielding layer is electrically connected with the grounding lead wire.

Figure 2:
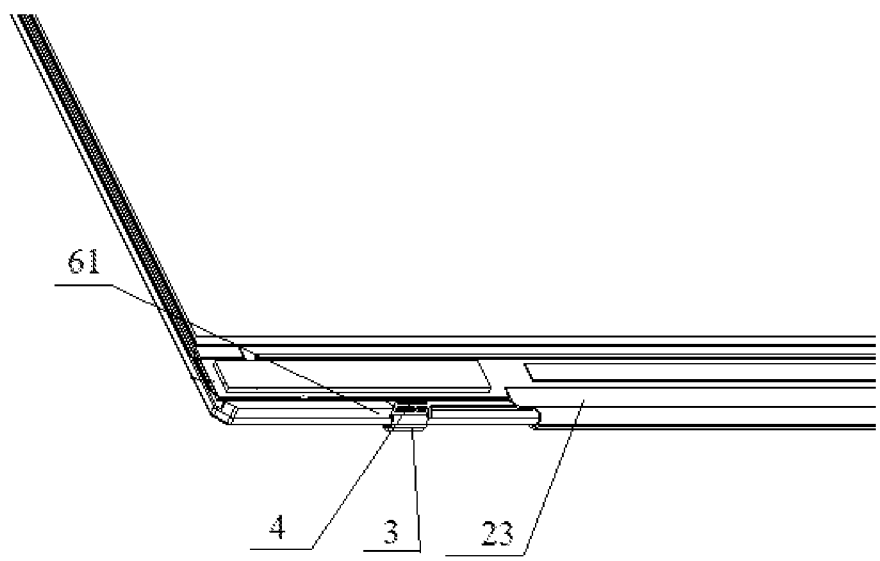
FIG. 2 is an enlarged perspective schematic structural view of a back side of the display module of FIG. 1.

Reference is made to a schematic structural view of an exemplary embodiment of the display module of the present disclosure as shown in FIG. 1 and FIG. 2. The display module may include a cover plate 1, a display integrated circuit 2, a grounding lead wire 3, a grounding conductor 4 and a shielding layer 5. The display integrated circuit 2 is disposed on one side of the cover plate 1 and has a grounding terminal; one end of the grounding lead wire 3 is electrically connected to the grounding terminal 24, and the other end is electrically connected to the grounding conductor 4; the shielding layer 5 is disposed on the a side of the cover plate 1 adjacent to the display integrated circuit 2 and is located between the cover plate 1 and the display integrated circuit 2, and the shielding layer 5 is electrically connected to the grounding conductor 4, to provide electromagnetic shielding for an electrical device such as the display integrated circuit 2.

It should be appreciated that in some exemplary embodiments of the present disclosure, the grounding lead wire 3 is configured in a variety of ways: it may be configured as part of the display integrated circuit, for example, one or several wirings in the display integrated circuit; it may also be used as part of a backlight integrated circuit in a backlight module; it may also be disposed separately according to actual needs.

In the present exemplary embodiment, the display module may be a liquid crystal display module. Of course, those skilled in the art may understand that the display module may also be a light-emitting diode display module, an organic light-emitting diode display module, or a micro organic light-emitting diode display module or the like.

In the present exemplary embodiment, the grounding conductor 4 may be an elastic conductor, and certainly may also be a non-elastic conductor of a suitable size so long as it can ensure excellent contact between the shielding layer and the grounding lead wire. The elastic conductor may employ a conductive foam, and certainly may also be a conductive material such as conductive rubber that can be compressed.

In the present exemplary embodiment, the grounding lead wire 3 may employ a copper lead wire with an insulating sheath, and a grounding window 31 may be disposed on the insulating sheath of the grounding lead wire 3, i.e., a zone or section may be disposed on the insulating sheath of the grounding lead wire 3, and the copper lead wire corresponding to the zone is exposed. For example, the grounding window 31 may be disposed at a section of the grounding lead wire 3 adjacent to the cover plate 1. In the grounding window 31, the elastic conductor may be bonded by a conductive bonding layer, so that the elastic conductor is fixed to the grounding lead wire 3 and electrically conductive with the grounding lead iii wire 3.

In the present exemplary embodiment, the shielding layer 5 may be directly bonded to the cover plate 1. The shielding layer 5 may be disposed as a rectangular shape. A length direction of the shielding layer 5 is consistent with a width direction of the cover plate 1, a width direction of the shielding layer 5 is consistent with a length direction of the cover plate 1, the length of the shielding layer 5 is smaller than the width of the cover plate 1, and the two spacings at both sides of the length direction of the shielding layer 5 are substantially the same, about 1 mm. It should be appreciated by those skilled in the art that in the present exemplary embodiment, the shielding layer is rectangular, but the present disclosure is not limited thereto. In other embodiments, the shielding layer may have other shapes according to actual needs or design requirements.

The shielding layer 5 may be a copper foil as a conductor. The elastic conductor and the shielding layer 5 may be attached together, and the shielding layer 5 is grounded through the elastic conductor and the grounding lead wire 3, thereby functioning to shield the radio frequency radiation. After the display module is assembled, the elastic conductor can be compressed, so that the elastic conductor and the shielding layer 5 are more closely attached, and a problem such as loose press-fitting does not occur. Certainly, the elastic conductor may be adhered to the shielding layer 5 through a conductive adhesive, whereas the elastic conductor is connected to the grounding window 31 via attachment, and the elastic conductor is mounted and compressed so that the elastic conductor is tightly attached to the grounding window 31.

In an exemplary embodiment, the display module may further include a backlight module 6 and a backlight integrated circuit 7. The backlight module 6 may include a first side and a second side which are disposed opposite to each other, and the backlight module 6 may correspond to the display area 9. The display integrated circuit 2 may be disposed on the first side of the backlight module 6. The backlight integrated circuit 7 may be disposed on the second side of the backlight module 6. The cover plate 1 may be disposed on a side of the backlight module 6 adjacent to the second side, that is, the backlight integrated circuit 7 is disposed between the backlight module 6 and the cover plate 1.

Figure 3:
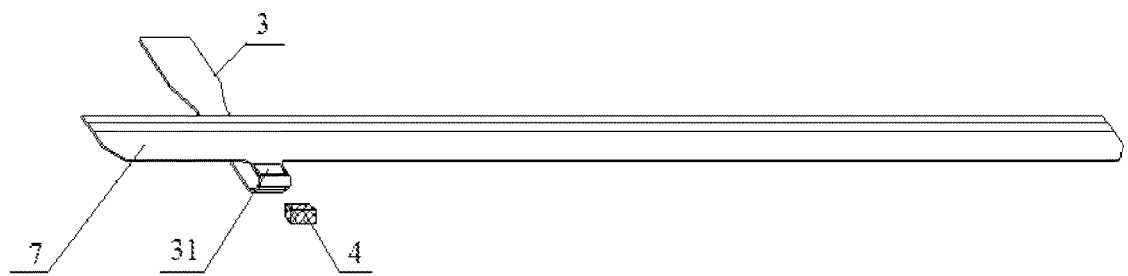
FIG. 3 is an enlarged schematic structural view of a backlight integrated circuit in the display module of FIG. 1.
Figure 4:
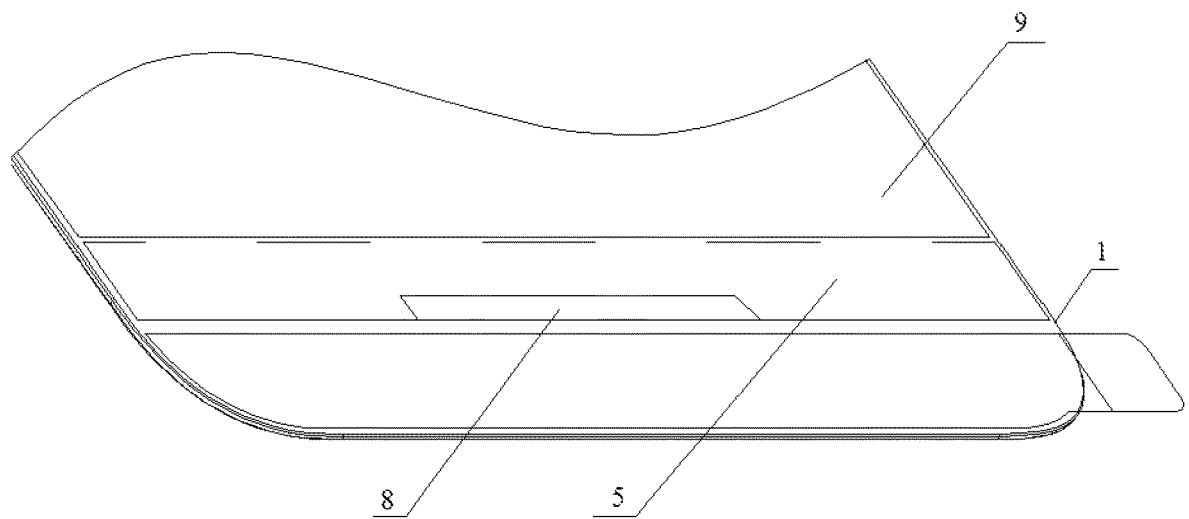
FIG. 4 is a schematic structural view of a cover plate in the display iii module of FIG. 1.

Reference is made to the schematic structural view of the backlight integrated circuit 7 shown in FIG. 3; in the present exemplary embodiment, the grounding lead wire 3 may be connected to the backlight integrated circuit 7, or the grounding lead wire 3 may serve as a part of the backlight integrated circuit 7. For example, the grounding lead wire 3 may be led out from the backlight integrated circuit 7, i.e., one end is connected to the backlight integrated circuit 7; the other end is connected to the display integrated circuit 2. In other words, the grounding lead wire 3 is connected between the backlight integrated circuit 7 and the display integrated circuit 2, and the backlight integrated circuit 7 may be grounded through the grounding lead wire 3. However, since the display integrated circuit 2 is disposed on the first side of the backlight module 6 and the backlight integrated circuit 7 is disposed on the second side of the backlight module 6, the grounding lead wire 3 cannot be connected to the display integrated circuit 2 and the backlight integrated circuit 7 unless the grounding lead wire 3 is disposed in a substantially U-shaped bent shape. Both the backlight integrated circuit 7 and the shielding layer 5 may be connected to the grounding terminal 24 of the display integrated circuit 2 through the grounding lead wire 3, and the structure is relatively simple.

The backlight integrated circuit 7 is used for electrically connecting, driving, and/or controlling elements in the backlight module 6 to achieve the backlighting function; and the display integrated circuit 2 is used for electrically connecting, driving, and/or controlling elements in the display module to achieve the displaying function.

In addition, in another exemplary embodiment of the present disclosure, the display module may include a backlight module and a display integrated circuit, wherein the display integrated circuit 2 may include a circuit body 21, a first bent portion 22 and a second bent portion 23; the circuit body 21 is disposed on a side of the backlight module facing to away from the cover plate; the first bent portion 22 is connected to the circuit body 21 and may be disposed substantially perpendicular to the circuit body 21; the second bent portion 23 is connected to the first bent portion 22, and is disposed on a side of the backlight module facing the cover plate, and the second bent portion 23 is disposed substantially in parallel with the circuit body 21. The second bent portion 23 may also be formed as or used as at least a portion of the grounding lead wire, and correspondingly the grounding window is located on a side of the second bent portion facing the shielding layer 5.

According to further examples of the present disclosure, the grounding lead wire 3 may be configured as part of the display integrated circuit. For example, the second bent portion 23 forms or acts as at least a portion of the grounding lead wire 3 and is provided with the grounded window, and the grounding conductor 4 is electrically connected to the grounding lead wire 3 through the grounding window.

Reference is made to the schematic structural view of the cover plate 1. Since the second bent portion 23 of the display integrated circuit 2 is disposed on the second side of the backlight module 6, the cover plate 1 is disposed on a side of the backlight module 6 adjacent to the second side, and the shielding layer 5 is disposed on the side of the cover plate 1 adjacent to the display integrated circuit 2. Therefore, after the display module is mounted, the second bent portion 23 of the display integrated circuit 2 may come into contact with the shielding layer 5, and the shielding layer 5 is electrically conductive so that the shielding layer 5 is electrically communicated with the display integrated circuit 2. Therefore, an insulating layer 8 may be disposed between the second bent portion 23 and the shielding layer 5, and an area of the insulating layer 8 may be larger than a contact area of the shielding layer 5 and the display integrated circuit 2. In addition, it may be appreciated by those skilled in the art that the insulating layer 8 is disposed on the shielding layer, and may be used not only to insulate the second bent portion 23 from the shielding layer, but also to insulate the shielded member from the shielding layer, so long as an orthographic projection of the insulating layer 8 on the cover plate covers the orthographic projection of the shielded member on the cover plate. The shielded member may be a backlight integrated circuit 7, a driver integrated circuit, or the like.

The elastic conductor may be configured to protrude from the backlight module. In the present exemplary embodiment, a height of the elastic conductor is higher than that of a plastic frame 61 at the periphery of the backlight module 6. Since after the display module is duly installed, the elastic conductor needs to be in a compressed state to maintain electrical conduction, the elastic conductor needs to be at the most protrusive position for compression. Generally, the plastic frame 61 at the periphery of the backlight module 6 is at the most protrusive position. As long as the height of the elastic conductor is higher than that of the plastic frame 61 at the periphery of the backlight module 6, the elastic conductor will be at the most protrusive position and will be compressed after installation. Further, in the case where the plastic frame 61 is not provided, it is feasible that the elastic conductor is at the most d position.

In the present exemplary embodiment, the cover plate 1 is a touch cover plate. Certainly, in other exemplary embodiments of the present disclosure, the cover plate 1 may not be a touch cover plate, but only a common glass cover plate.

The above display module will be described below through a specific exemplary embodiment.

Referring to FIG. 1, in the present exemplary embodiment, the display module includes a cover plate 1 and a backlight module 6 which are sequentially disposed from bottom to top, and the cover plate 1 is a touch cover plate. A display integrated circuit 2 is disposed on the backlight module 6, the display integrated circuit 2 is a main FPC (flexible printed circuit) board, and the main FPC board is successively bent to a side surface and a lower surface of the backlight module 6, to form a first bent portion 22 and a second bent portion 23 in turn. A shielding layer 5 is disposed on the cover plate 1 and under the backlight module 6, and an insulating layer 8 is disposed on the shielding layer 5. The insulating layer 8 can insulate electronic devices such as the second bent portion 23 of the main FPC board and the backlight integrated circuit 7 from the shielding layer 5. The backlight integrated circuit 7 is further disposed between the cover plate 1 and the backlight module 6. The backlight integrated circuit 7 is connected to the grounding lead wire 3, and the grounding lead wire 3 is bent to an upper surface of the backlight module 6 (namely, a surface of the backlight module 6 facing the side of the display integrated circuit 2) and connected to the grounding terminal of the main FPC board. A grounding window is disposed on a section of the grounding lead wire 3 on the lower surface of the backlight module 6, a conductive foam is adhered to the grounding window, the conductive foam is connected to the shielding layer 5, and the shielding layer 5 is grounded. The shielding layer 5 can provide electromagnetic shielding for electronic devices such as the main FPC board and the backlight integrated circuit 7. The "up" and "down" in the present exemplary embodiment are both based on "up" and "down" as shown in FIG. 1.

Further, some exemplary embodiments of the present disclosure provide a display device including the above display module. The specific structure of the display module has been described in detail above and will not be described in detail any more here.

The present disclosure has advantages and technical effects in the following at least one aspect:

In one aspect, in the display module of some exemplary embodiments of the present disclosure, electromagnetic shielding is provided for an electronic device such as the driver integrated circuit through the shielding layer 5, the shielding layer 5 is connected to the grounding lead wire 3 through the grounding conductor (e.g., an elastic conductor), and the grounding lead wire 3 is connected to the grounding terminal (e.g., the grounding terminal 24 of the display integrated circuit 2), thereby grounding the shielding layer 5.

In another aspect, shielding the display integrated circuit 2 through the shielding layer 5 can avoid radio frequency radiation interference between the display integrated circuit 2 and the antenna. As such, the radio frequency radiation interference between an electronic device such as a driving IC and the antenna can be avoided in a way that the shielding layer 5 provides electromagnetic shielding for the electronic device such as the driving IC of the display integrated circuit 2.

In a further aspect, the shielding layer 5 is disposed on the cover plate 1, the shielding layer 5 and the cover plate 1 can be integrally produced, and the production efficiency is improved; as compared with the shielding layer attached to the driver integrated circuit, the shielding layer 5 is not limited by the size and structure of the driver integrated circuit, the area of the shielding layer 5 may also be designed large, achieving a better shielding effect; furthermore, it is unnecessary to design a dedicated shielding layer for the driver integrated circuit, thereby reducing the design workflow.

In a further aspect, the elastic conductor may have elasticity. After the display module is duly mounted, the elastic conductor is compressed, and the shielding layer 5 and the grounding lead wire 3 are connected through the elastic conductor to ensure good contact.

The features, structures, or characteristics described above may be combined in any suitable manner in one or more embodiments, and the features discussed in the various embodiments are interchangeable, if possible. In the above description, numerous specific details are presented to provide a thorough understanding of the embodiments of the disclosure. However, those skilled in the art will appreciate that the technical solutions of the present disclosure may be practiced without one or more of the specific details, or by employing other methods, components, materials and the like. In other cases, well-known structures, materials or operations are not shown or described in detail to avoid obscuring aspects of the present disclosure.

The terms "about" or "approximately" as used in this specification generally means within 20%, preferably within 10%, and more preferably within 5% of a given value or range. The amount given herein is an approximate amount. This means that without a specific explanation, the meaning "about", "around", "approximately" and "roughly" may still be implied.

Although the relative terms such as "up" and "down" are used in the specification to describe a relative relationship of one component marked with a reference number to another component, these terms are used in this specification for convenience only, for example, according to the direction of examples shown in the figures. It can be understood that if the marked device is flipped upside down, the "upper" component described above will become the "lower" component. When a structure is "on" another structure, it may mean that the structure is integrally formed on the another structure, or that the structure is "directly" disposed on the another structure, or that the structure is "indirectly" disposed on the another structure through a further structure.

In the present specification, the terms "a", "an", "the" and "the" are used to mean the presence of one or more elements/components, etc.; the terms "including", "comprising" and "having" are used to represent including in an open-ended type and means that there may be additional elements/components/etc. in addition to the listed elements/components/etc.; the terms "first", "second" and "third" etc. are used only as a sign, not a limitation of the number of objects modified by them.

It should be understood that the present disclosure does not limit its application to the detailed structure and arrangement of the components presented in the specification. The present disclosure can have other embodiments, and can be implemented and executed in many manners. The foregoing variations and modifications are intended to fall within the scope of the present disclosure. It should be appreciated that the disclosure disclosed and claimed herein extends to all alternative combinations of two or more individual features that are mentioned or apparent in the text and figures. All of these different combinations constitute a number of alternative aspects of the present disclosure. The embodiments described herein illustrate some known modes for implementing the present disclosure, and will enable those skilled in the art to utilize the present disclosure.

The invention claimed is:

1. A display module, comprising:
a cover plate;
a display integrated circuit disposed on a side of the cover plate and having a grounding terminal;
a grounding lead wire whose first end is electrically connected to the grounding terminal, and whose second end is electrically connected to a grounding conductor; and
a shielding layer disposed between the cover plate and the display integrated circuit and electrically connected to the grounding conductor,
wherein the grounding lead wire comprises an insulating sheath, a grounding window is provided at the insulating sheath of the grounding lead wire, and the grounding conductor is electrically connected to the grounding lead wire through the grounding window.

2. The display module according to claim 1, wherein a grounding window is disposed at a section of the grounding lead wire adjacent to the cover plate, and the grounding conductor is electrically connected to the grounding lead wire through the grounding window.

3. The display module according to claim 1, wherein the display module further comprises a backlight module, and the display integrated circuit comprises:
a circuit body disposed on a side of the backlight module facing away from the cover plate;
a first bent portion connected to the circuit body;
a second bent portion connected to the first bent portion and located on a side of the backlight module facing the cover plate, wherein the second bent portion is configured to form at least a portion of the grounding lead wire and provide with a grounding window, the grounding conductor is electrically connected to the grounding lead wire through the grounding window.

4. The display module according to claim 1, wherein the display module further comprises a backlight integrated circuit, and the grounding lead wire is configured as a portion of the backlight integrated circuit.

5. The display module according to claim 1, wherein the display module further comprises a backlight integrated circuit electrically connected to the grounding lead wire at the second end of the grounding lead wire.

6. The display module according to claim 3, wherein the display module further comprises an insulating layer disposed between the display integrated circuit and the shielding layer, and an orthographic projection of the insulating layer on the cover plate covers an orthographic projection of the display integrated circuit on the cover plate.

7. The display module according to claim 6, wherein the display integrated circuit comprises a driver integrated circuit.

8. The display module according to claim 1, wherein the grounding lead wire comprises a copper lead wire.

9. The display module according to claim 3, wherein the grounding lead wire is substantially U-shaped.

10. The display module according to claim 1, wherein the display integrated circuit is a flexible circuit board.

11. The display module according to claim 1, wherein the grounding conductor is an elastic conductor.

12. The display module according to claim 11, wherein the elastic conductor is configured to protrude from the backlight module.

13. The display module according to claim 11, wherein the elastic conductor comprises a conductive foam.

14. The display module according to claim 11, wherein the shielding layer is bonded to a side of the cover plate facing the display integrated circuit.

15. A display device, comprising the display module according to claim 1.

16. A display device, comprising the display module according to claim 2.

17. A display device, comprising the display module according to claim 3.

18. A display device, comprising the display module according to claim 4.

19. A display device, comprising the display module according to claim 5.

20. A display device, comprising the display module according to claim 6.

* * * * *